United States Patent [19]

Golob et al.

[11] Patent Number: 4,507,006

[45] Date of Patent: Mar. 26, 1985

[54] QUICK-RELEASE MECHANICAL COUPLING FOR A KITCHEN APPLIANCE

[75] Inventors: Jurgen Golob, Friedrichsdorf; Alfred Gehrmann, Eschborn, both of Fed. Rep. of Germany

[73] Assignee: Braun Aktiengesellschaft, Kronberg, Fed. Rep. of Germany

[21] Appl. No.: 434,436

[22] Filed: Oct. 14, 1982

[30] Foreign Application Priority Data

Oct. 17, 1981 [DE] Fed. Rep. of Germany ....... 3141355

[51] Int. Cl.³ .............................................. F16D 1/00
[52] U.S. Cl. .................................... 403/24; 403/348; 99/511
[58] Field of Search ................ 403/348, 349, 343, 24, 403/25; 767/112, 115, 120; 99/511, 512, 513; 210/455

[56] References Cited

U.S. PATENT DOCUMENTS

| 2,101,679 | 12/1937 | Hull | 403/361 X |
| 2,304,929 | 12/1942 | Keith | 99/512 |
| 3,880,546 | 4/1975 | Segal | 403/348 |
| 4,101,070 | 7/1978 | Hoare et al. | 403/348 |

FOREIGN PATENT DOCUMENTS

| 207519 | 2/1960 | Austria | 99/511 |
| 223337 | 2/1962 | Austria . | |
| 1935137 | 2/1966 | Fed. Rep. of Germany . | |
| 7032750 | 11/1970 | Fed. Rep. of Germany . | |
| 303611 | 2/1955 | Switzerland . | |
| 190884 | 1/1923 | United Kingdom | 403/349 |

Primary Examiner—Thomas F. Callaghan
Attorney, Agent, or Firm—Raymond J. De Vellis

[57] ABSTRACT

A quick-release mechanical coupling for a kitchen appliance with a drive shaft, which includes an attachment for the kitchen appliance, a first coupling ring rotationally integral with the attachment, a second coupling ring rotationally integral with the drive shaft, at least one connecting pin provided on one of the coupling rings, and at least one recess provided on the other coupling ring, the recess having a central slot portion and first and second branch portions extending in opposite circumferential directions from the central slot portion.

7 Claims, 4 Drawing Figures

QUICK-RELEASE MECHANICAL COUPLING FOR A KITCHEN APPLIANCE

BACKGROUND OF THE INVENTION

1. Field of the Invention

This invention relates to a kitchen appliance, particularly a juicer, which has a removable strainer that may be mechanically coupled to a rotating drive shaft of the appliance.

2. Description of the Prior Art

In such devices, it is known to couple the strainer to the rotating drive by means of a screw connection, which may be, for example, in the form of a threaded bolt associated with a fan wheel seated on the drive shaft. The strainer, which is provided with a concentric hole in its bottom, is placed on the fan wheel over the threaded bolt and is secured thereto by screwing a threaded nut onto the threaded bolt. The nut is fastened onto the bolt (sometimes by the use of a suitable tool), and thus the strainer bottom is pressed against the upper flat surface of the fan wheel.

Such a connection between the appliance drive shaft and the strainer requires a threaded nut and sometimes one or more spacer or safety washers. These loose components can be easily misplaced. Moreover, a suitable tool for tightening and loosening the nut may be required, and this component is also susceptible to being misplaced.

Additionally, the requirement that the strainer have a concentric hole in its base results in sealing problems making necessary corresponding countermeasures, such as the insertion of gaskets on the threaded bolt.

In another type of known coupling mechanism, the drive shaft and the strainer are each provided with a screw-shaped coupling part which can be engaged with one another. Each coupling half includes several threads of a relatively large pitch, so that a full mutual rotation of the two coupling parts is not necessary to join or disengage them.

This known coupling mechanism overcomes the above-noted disadvantages of additional and loose components which can be misplaced, but such a coupling mechanism is effective in only one rotational direction. When force is applied in the reverse rotational direction by the appliance driving mechanism, for example during braking, the driven coupling half tends to become disengaged from the driving coupling half. During braking therefore, a strainer attachment driven through such a coupling mechanism could be hurled against the cover section of the appliance, in which case the interior of the appliance would become soiled if not damaged.

SUMMARY OF THE INVENTION

In order to overcome the above-mentioned disadvantages, the present inventive coupling mechanism allows quick and problem free insertion of the strainer attachment, while guaranteeing a reliable coupling between the strainer and the appliance drive shaft.

In general, the invention features a quick-release mechanical coupling mechanism for a kitchen appliance with a drive shaft, including an attachment for the kitchen appliance, a first coupling ring rotationally integral with the attachment, and a second coupling rotationally integral with the drive shaft, one of the coupling rings being provided with at least one connecting pin and the other of the coupling rings being provided with at least one recess having a central slot portion and first and second branch portions extending in opposite circumferential directions from the central slot portion.

In preferred embodiments, the first and second branches each converge in opposite circumferential directions away from the central slot portion; the first and second branches each have a first edge and a second edge disposed at an oblique angle with respect to the first edge; the inner diameter of one of the coupling rings is substantially equal to the outer diameter of the other coupling ring; three of the connecting pins are equally spaced around the first coupling ring and three of the recesses are equally spaced around the second coupling ring; the kitchen appliance is provided with a fan wheel and the second coupling ring is mounted on the fan wheel; and a centering pin mounted on the fan wheel and a recess on the attachment for receiving the centering pin are also provided.

These and other features of the present invention will be made clear through a description of a preferred embodiment, reference being had to the accompanying drawings wherein:

(a) with the strainer being inserted into the appliance,
(b) with the appliance in operation, and
(c) during braking of the appliance.

DESCRIPTION OF THE PREFERRED EMBODIMENT

Figure 1:
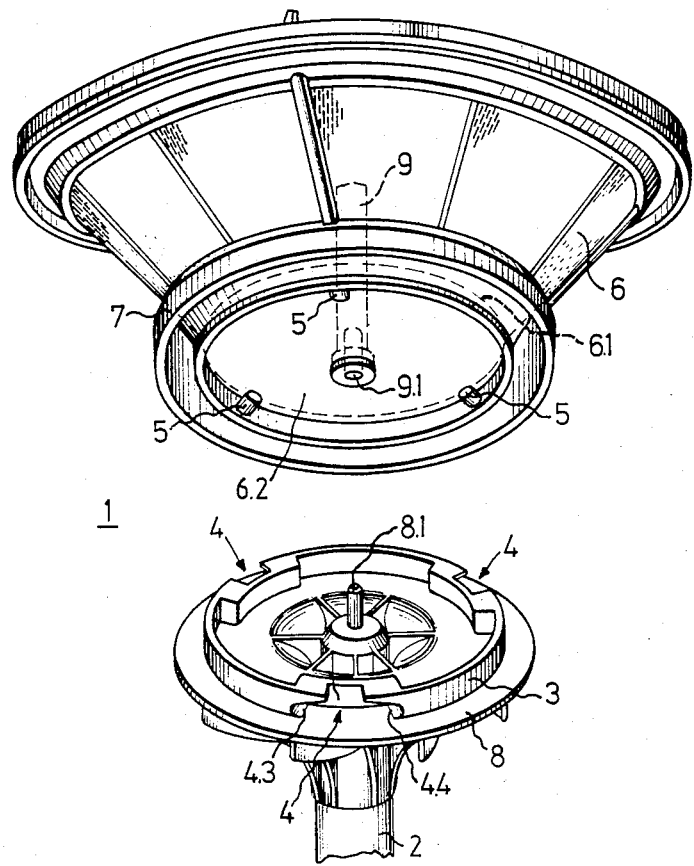
FIG. 1 is a perspective view of a drive shaft and fan wheel of a kitchen appliance, having a strainer coupled thereto by means of a coupling mechanism according to the invention.

Referring now to FIG. 1, a kitchen appliance juicer attachment generally designated by reference numeral 1, includes a motor drive shaft 2, a fan wheel 8 rotationally integral with drive shaft 2, and a coupling ring 3 rotationally integral with fan wheel 8 and drive shaft 2. Coupling ring 3 is provided with three recesses 4 disposed at equal angular spacings with respect to one another.

A strainer attachment, generally designated by reference numeral 6, includes a bottom portion 6.1 and a second coupling ring 7. Coupling ring 7 is rotationally integral with strainer 6 and is provided with three equally spaced horizontal and inwardly protruding coupling pins 5, whose angular spacing is such that, when strainer 6 is placed upon fan wheel 8, pins 5 engage recesses 4 provided in coupling ring 3.

To facilitate the attachment and disengagement of strainer 6 with respect to the kitchen appliance drive motor, fan wheel 8 is provided with a centering pin 8.1. Simiarly, the bottom portion 6.1 of strainer 6 is provided with a centrally located holding pin 9 having a blind bore 9.1 in its lower portion. Bottom portion 6.1 of strainer 6 may also be provided with a friction pad on its lower surface.

Figure 2A:
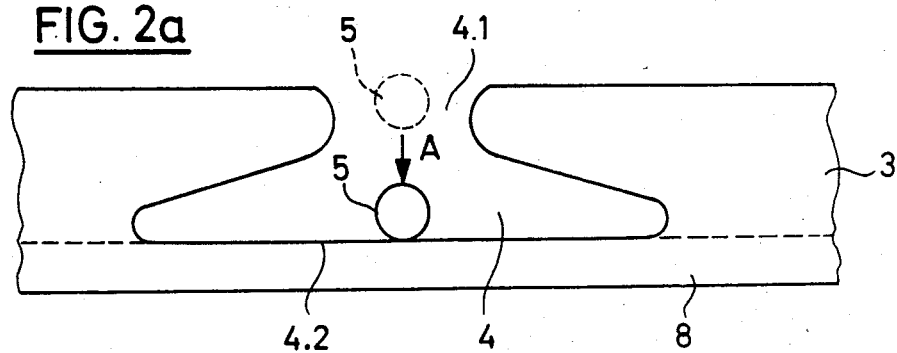
FIG. 2 is a schematic representation of the coupling mechanism of FIG. 1 under the following respective conditions.

Referring now to FIG. 2a, which shows schematically the relative positioning of one of connecting pins 5 with respect to one of recesses 4 provided on coupling ring 3 after strainer 6 has been inserted into the kitchen appliance, strainer 6 is inserted in the direction indicated by an arrow A such that each coupling pin 5 drops through a centrally located slot portion 4.1 provided in each recess 4 and contacts and is positioned by a horizontal surface 4.2. With this relative positioning, strainer 6 may be easily withdrawn from the kitchen appliance merely by lifting each of connecting pins 5 through each centrally located slot portion 4.1.

Figure 2B:
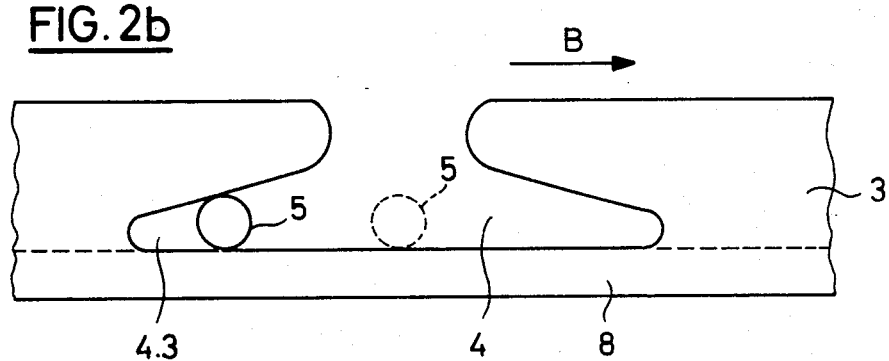

In FIG. 2b there is shown the relative positioning of each of connecting pins 5 and recesses 4 when the juicer is in operation, such that connecting ring 3 is rotating in the direction indicated by an arrow B. In this situation, each of connecting pins 5 is driven by inertial forces into a first branch portion 4.3 provided adjacent each central slot portion 4.1 in each of recesses 4. Each branch portion 4.3 converges in the circumferential direction away from central slot portion 4.1 and has a substantially horizontal lower edge and an upper edge displaced at an oblique angle with respect to the lower edge.

Consequently, due to inertial forces, each of connecting pins 5 is engaged in each of branch portions 4.3 with a slight clamping action.

Figure 2C:
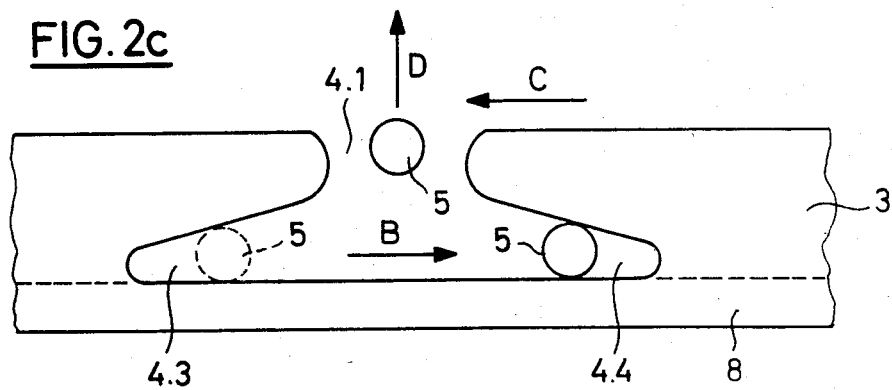

FIG. 2c shows the relative positioning of the various components after the kitchen appliance has been switched off and, additionally, the manner in which strainer 6 is removed from the kitchen appliance. When the kitchen appliance driving motor is switched off, a braking action takes place, and inertial forces cause a relative movement between each of connecting pins 5 and each of recesses 4, with each of recesses 4 undergoing relative movement in the direction indicated by an arrow C and each of connecting pins 5 undergoing a relative movement in the direction indicated by an arrow B. Consequently, each of connecting pins 5 moves from a dotted line position shown located in first branch portion 4.3 to a solid line position shown located in a second branch portion 4.4 of each recess 4. Like first branch portions 4.3, each of second branch portions 4.4 converges in a circumferential direction away from central slot portion 4.1 and has a substantially horizontal bottom edge and a top edge which forms an oblique angle with respect to the bottom edge. Inertial forces caused by braking tend to wedge each connecting pin 5 into each second branch portion 4.4, and thus, strainer attachment 6 remains firmly secured to the kitchen appliance throughout the braking period.

Once the braking process is complete, strainer attachment 6 may be easily removed from the kitchen appliance by a slight rotation in the direction indicated by arrow C followed by a withdrawal of each connecting pin 5 through each central slot portion 4.1 in the direction shown by an arrow D.

In the construction shown and described, the provision of a number of recesses having a central slot portion associated with first and second branch portions which converge in circumferential directions away from the central slot portion, in association with the provision of a number of connecting pins, allows positive coupling of an attachment to a kitchen appliance during both acceleration and braking, as well as easy and quick insertion and disengagement of the attachment from the kitchen appliance.

While the invention has been described by way of a preferred embodiment, various substitutions of equivalents may be effected which do not depart from the spirit and scope of the invention as set forth in the appended claims. For example, the connecting ring which is rotationally integral with fan wheel 8 could be provided with pins 5 rather than recesses 4, and the connecting ring which is rotationally integral with strainer 6 could be provided with recesses 4 rather than connecting pins 5.

What is claimed and desired to be secured by Letters Patent of the United States is:

1. A quick release mechanical coupling for a kitchen appliance having a drive shaft, comprising:
   an attachment for said kitchen appliance;
   a first coupling ring rotationally integral with said attachment, and
   a second coupling ring rotationally integral with said drive shaft;
   wherein one of said first and second coupling rings is provided with at least one connecting pin and the other of said first and second coupling rings is provided with at least one recess having a central slot portion and first and second relatively extended branch portions with first and second converging edges extended in opposite circumferential directions from said central slot portion;
   said pin being of generally rounded cross-section such that it may be wedged into either of said first or second branch portions by relative rotation of said first and second coupling rings thereby frictionally intercoupling said rings in both an axial and a rotational sense;
   whereby said pin may be inserted in said central slot portion and, by relative rotation of said first and second coupling rings, will be frictionally clamped between said first and second converging edges of one of said first and second branch portions.

2. The coupling mechanism of claim 1, wherein each of said first and second edges are disposed at an acute angle with respect to one another.

3. The coupling mechanism of claim 2, wherein the inner diameter of one of said coupling rings is substantially equal to the outer diameter of the other of said coupling rings.

4. The coupling mechanism of claim 3, wherein said first coupling ring is provided with said connecting pin and said second coupling ring is provided with said recess.

5. The coupling mechanism of claim 4, wherein said first coupling ring is provided with three of said connecting pins disposed in equal angular spacing around said first coupling ring, and wherein said second coupling ring is provided with three of said recesses disposed in equal angular spacing around said second coupling ring.

6. The coupling mechanism of claim 5, wherein said kitchen appliance is provided with a fan wheel, and wherein said second coupling ring is mounted on said fan wheel.

7. The coupling mechanism of claim 6, further comprising a centering pin mounted on said fan wheel and a recess provided on said attachment for receiving said centering pin.

* * * * *